(12) United States Patent
Park

(10) Patent No.: US 12,139,103 B2
(45) Date of Patent: Nov. 12, 2024

(54) SMART KEY REMOTE CONTROLLER AND LOW POWER OPERATING METHOD OF THE SAME

(71) Applicant: HYUNDAI MOBIS CO., LTD., Seoul (KR)

(72) Inventor: Yong Hee Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 352 days.

(21) Appl. No.: 17/653,247

(22) Filed: Mar. 2, 2022

(65) Prior Publication Data

US 2022/0281412 A1 Sep. 8, 2022

(30) Foreign Application Priority Data

Mar. 2, 2021 (KR) .................. 10-2021-0027678
Mar. 10, 2021 (KR) .................. 10-2021-0031676

(51) Int. Cl.
*B60R 25/24* (2013.01)
*B60R 25/01* (2013.01)
*G05D 1/00* (2024.01)

(52) U.S. Cl.
CPC ............ *B60R 25/245* (2013.01); *B60R 25/01* (2013.01); *G05D 1/0016* (2013.01); *G05D 1/0022* (2013.01); *B60R 2325/101* (2013.01)

(58) Field of Classification Search
CPC ...... B60W 30/06; H04W 4/80; G05D 1/0016; B60R 25/245

USPC ............................................................ 701/2
See application file for complete search history.

(56) References Cited

U.S. PATENT DOCUMENTS 11,299,912 B2 * 4/2022 Koya .................. E05B 47/0001
2020/0122686 A1 * 4/2020 Siswick ................. B60R 25/01

FOREIGN PATENT DOCUMENTS

KR        20200071201 A  * 12/2018
WO    WO-2020167627 A1  *  8/2020

* cited by examiner

*Primary Examiner* — Todd Melton
*Assistant Examiner* — Vincent Feng
(74) *Attorney, Agent, or Firm* — DLA Piper LLP US

(57) ABSTRACT

A low power operating method for a smart key remote controller of a vehicle, wherein the method includes connecting the smart key remote controller to a smart key control system in a vehicle based on a first frequency signal, after the connection, acquiring a vibration detection value through a vibration detection sensor, checking a strength of the first frequency signal (a received signal strength indicator (RSSI)) received after the connection, determining whether the vibration detection value is greater than or equal to a preset vibration value and the strength of the first frequency signal is greater than or equal to a preset signal strength value, and when a determination result is satisfied, activating a module corresponding to a second frequency signal.

19 Claims, 7 Drawing Sheets

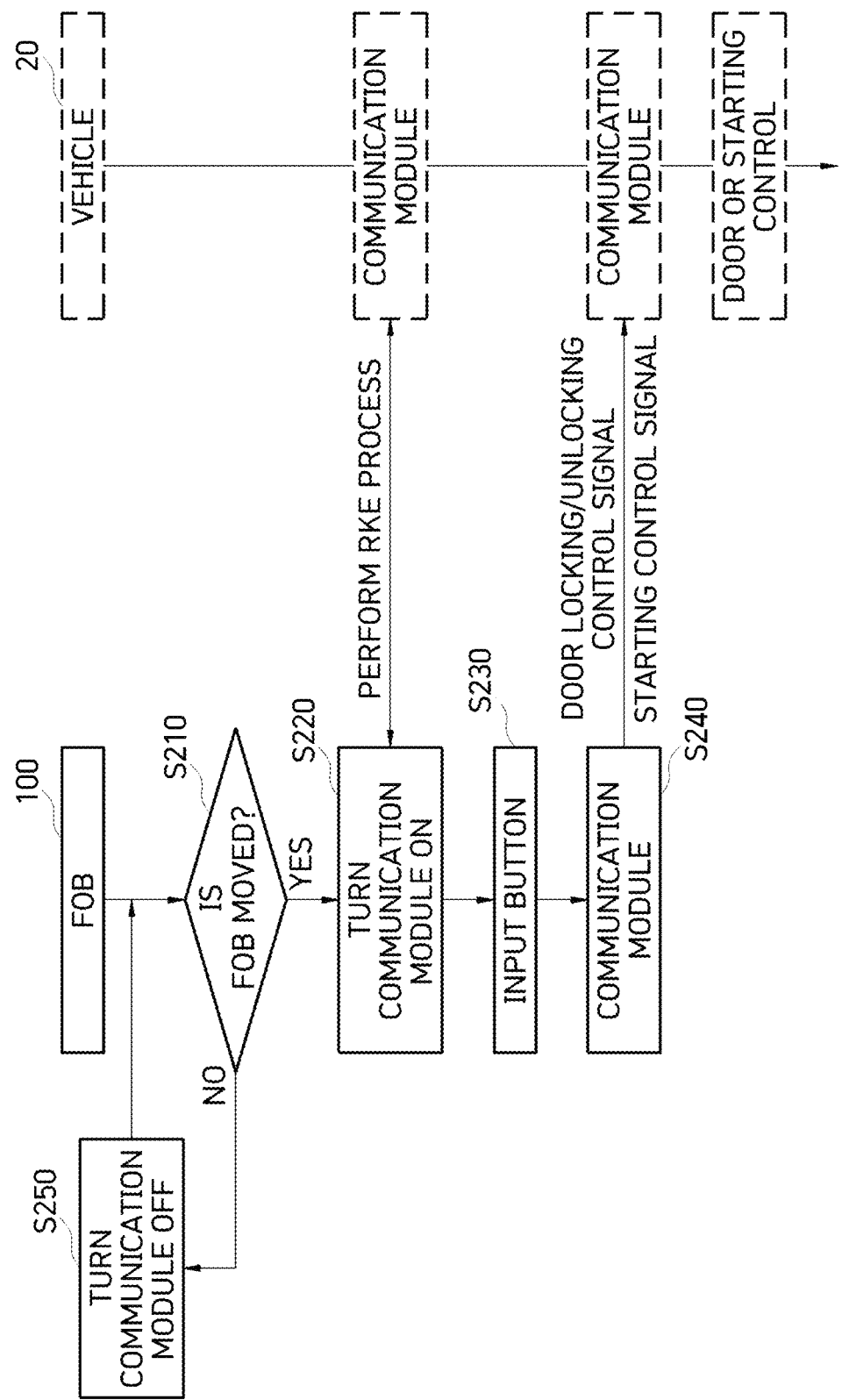

SMART KEY REMOTE CONTROLLER AND LOW POWER OPERATING METHOD OF THE SAME

CROSS-REFERENCE TO RELATED APPLICATION

This application claims priority to and the benefit of Korean Patent Applications Nos. 10-2021-0027678, filed on Mar. 2, 2021 and 10-2021-0031676 filed on Mar. 10, 2021 the disclosures of which are incorporated herein by references in their entirety.

BACKGROUND

Field of the Invention

The present invention relates to a smart key remote controller of a vehicle and a low power operating method of the same.

Discussion of Related Art

Recently, in order to provide convenience to a driver, most vehicles are provided with smart key remote controllers and smart key control systems which can control the opening and closing of doors and turning on/off ignition of the vehicles at a remote site away from the vehicles.

Fob circuits currently being mass-produced perform wireless communication using a low frequency (LF) signal of 125 kHz and a radio frequency (RF) signal of 433.92 MHz (in an ultrahigh frequency (UHF) band). For example, an LF signal is used for authentication of a smart key, and an RF signal of a UHF band is used for vehicle control.

In addition, a fob, which is being developed in advance, performs wireless communication using a near field communication (NFC) of 13.56 MHz, a Bluetooth low energy (BLE) of 2.4 GHz, and an ultra-wide band (UWB) signal. In this case, an NFC module, a BLE module, and a UWB module, which are provided in a vehicle, communicate with a fob to perform door lock/unlock control of the vehicle and a vehicle start function.

However, the existing fob has a disadvantage in that battery consumption is large due to frequent communication with a smart key control system of the vehicle.

Related Art Document

Patent Document
Korean Patent Laid-Open Application No. 10-2019-0071434 (Jun. 24, 2019)

SUMMARY OF THE INVENTION

The present invention is directed to providing a smart key remote controller of a vehicle, which is capable of detecting the movement of a user and minimizing battery consumption of a fob using a result of detecting a variation in strength of a frequency signal, and a low power operating method of the same.

However, problems to be solved by the present invention are not limited to the above problems, and other problems may exist.

According to an aspect of the present invention, there is provided a low power operating method of a smart key remote controller of a vehicle, which includes connecting the smart key remote controller to a smart key control system in the vehicle on the basis of a first frequency signal, after the connection, acquiring a vibration detection value through a vibration detection sensor, checking a strength of the first frequency signal (a received signal strength indicator (RSSI)) received after the connection, determining whether the vibration detection value is greater than or equal to a preset vibration value and the strength of the first frequency signal is greater than or equal to a preset signal strength value, and when a determination result is satisfied, activating a module (hereinafter, referred to as a second frequency signal module) corresponding to a second frequency signal.

According to another aspect of the present invention, there is provided a smart key remote controller of a vehicle, which allows low power operation, the smart key remote controller including a first frequency signal module connected to a smart key control system on the basis of a first frequency signal, a second frequency signal module connected to a smart key control system on the basis of a second frequency signal, a vibration detection sensor configured to acquire a vibration detection value after connection through the first frequency signal module, and a control module configured to measure a strength of the first frequency signal (a received signal strength indicator (RSSI)) received after the connection through the first frequency signal module and activate the second frequency signal module on the basis of whether the vibration detection value is greater than or equal to a preset vibration value and whether the strength of the first frequency signal is greater than or equal to a preset signal strength value.

According to still another aspect of the present invention, there is provided a computer program which is combined with a computer, which is hardware, to execute the low power operating method of the smart key remote controller of the vehicle and which is stored in a computer-readable recording medium.

The details of other example embodiments of the present invention are included in the detailed description and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 10 illustrates a method performed by the motion-based smart key control system according to one embodiment of the present invention.

DETAILED DESCRIPTION OF EXEMPLARY EMBODIMENTS

Figure 1:
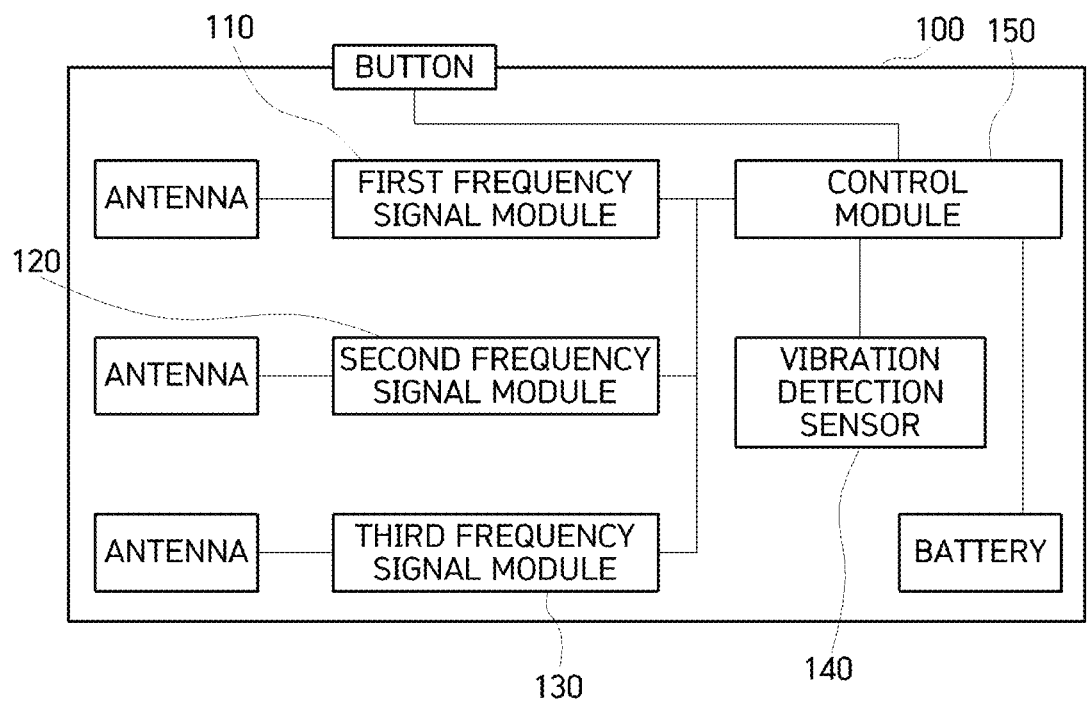
FIG. 1 is a diagram for describing a smart key remote controller according to one embodiment of the present invention.

Advantages, features, and implementations thereof will be apparent from embodiments which are described in detail below together with the accompanying drawings. The present invention may, however, be implemented in many different forms and should not be construed as being limited to the embodiments set forth herein, and the embodiments are provided such that this disclosure will be thorough and complete and will fully convey the scope of the present invention to those skilled in the art to which the present invention pertains, and the present invention is defined by only the scope of the appended claims.

Terms used herein are for the purpose of describing the embodiments and are not intended to limit the present invention. In this disclosure, the singular forms include the plural forms unless the context clearly dictates otherwise. It is noted that the terms "comprises" and/or "comprising" used herein do not exclude the presence or addition of one or more other components in addition to stated components. The same reference numerals refer to the same components throughout this disclosure, and the term "and/or" includes each of the stated components and one or more combinations thereof. Although the terms first, second, and the like are used to describe various components, these components are substantially not limited by these terms. These terms are used only to distinguish one component from another component. Therefore, a first component described below may be substantially a second component within the technical spirit of the present invention.

Unless defined otherwise, all terms (including technical and scientific terms) used herein may be used in a sense commonly understood by those skilled in the art to which the present invention pertains. In addition, terms defined in a commonly used dictionary are not to be interpreted ideally or excessively unless specifically defined explicitly.

Figure 2:
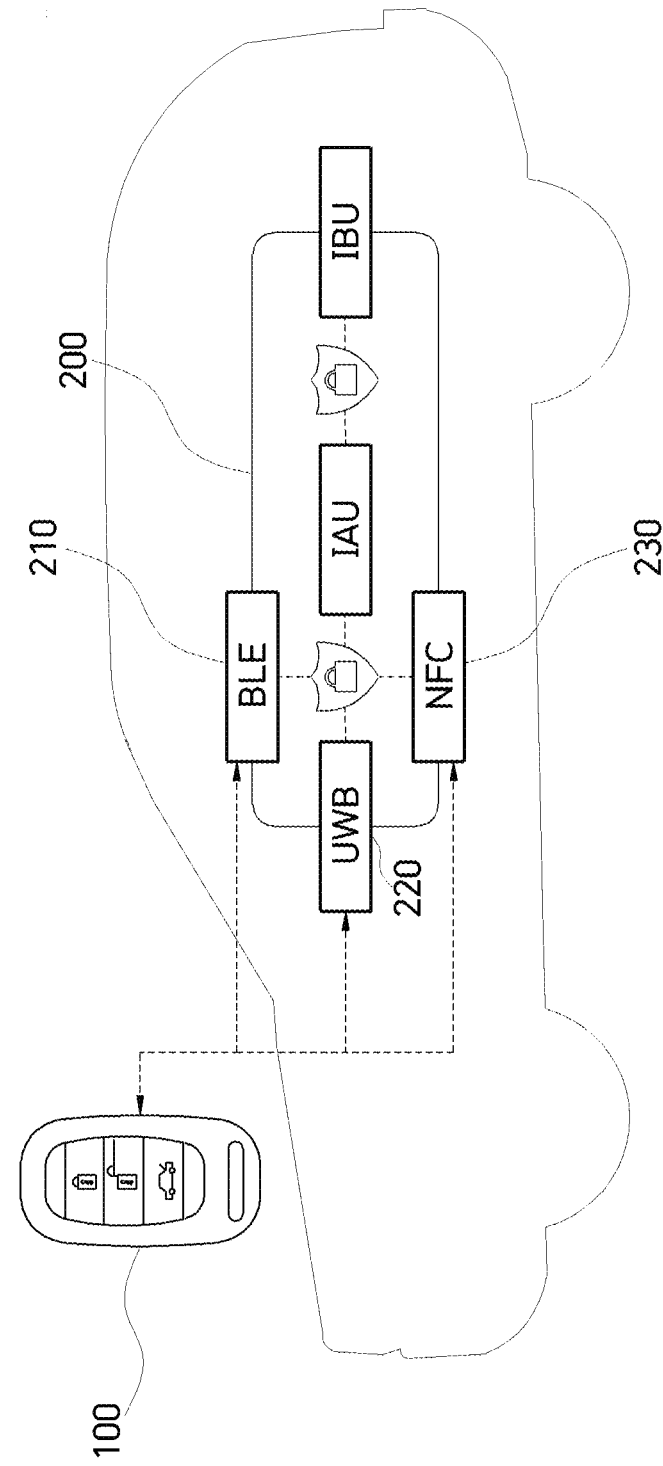
FIG. 2 is a diagram for describing a smart key control system according to one embodiment of the present invention.

FIG. 1 is a diagram for describing a smart key remote controller 100 according to one embodiment of the present invention. FIG. 2 is a diagram for describing a smart key control system 200 according to one embodiment of the present invention.

The smart key remote controller 100 according to one embodiment of the present invention includes a first frequency signal module 110, a second frequency signal module 120, a vibration detection sensor 140, and a control module 150.

As one example, the first frequency signal module 110 may be a Bluetooth low energy (BLE) module, and the second frequency signal module 120 may be an ultra-wide band (UWB) module, but the present invention is not limited thereto. Hereinafter, a description will be made in which the first frequency signal module 110 is a BLE module, the second frequency signal module 120 is a UWB module, and a BLE module 210 and a UWB module 220 corresponding to the first frequency signal module 110 and the second frequency signal module 120, respectively, are provided in the smart key control system 200 in the vehicle.

In addition, in one embodiment of the present invention, the smart key remote controller 100 may include a third frequency signal module 130 (a near field communication (NFC) module) for registering the smart key remote controller 100 in the smart key control system 200 and allowing opening/closing control of a door and vehicle starting control when the smart key remote controller 100 is discharged.

The second frequency signal module 120 in the smart key remote controller 100 performs UWB communication with the UWB module of the smart key control system 200 of the vehicle. The control module 150 may check whether a vehicle user possessing the smart key remote controller 100 is near or in the vehicle on the basis of a second frequency signal to control the opening or closing of a vehicle door and control vehicle starting.

When the user possessing the smart key remote controller 100 approaches the vehicle within several tens of meters, the first frequency signal module 110 of the smart key remote controller 100 is connected to the BLE module 210 of the smart key control system 200. BLE communication is possible even at a distance of 30 meters or more, and thus the user may perform the opening or closing control of the vehicle door at a long distance and can control vehicle starting.

Figure 3:
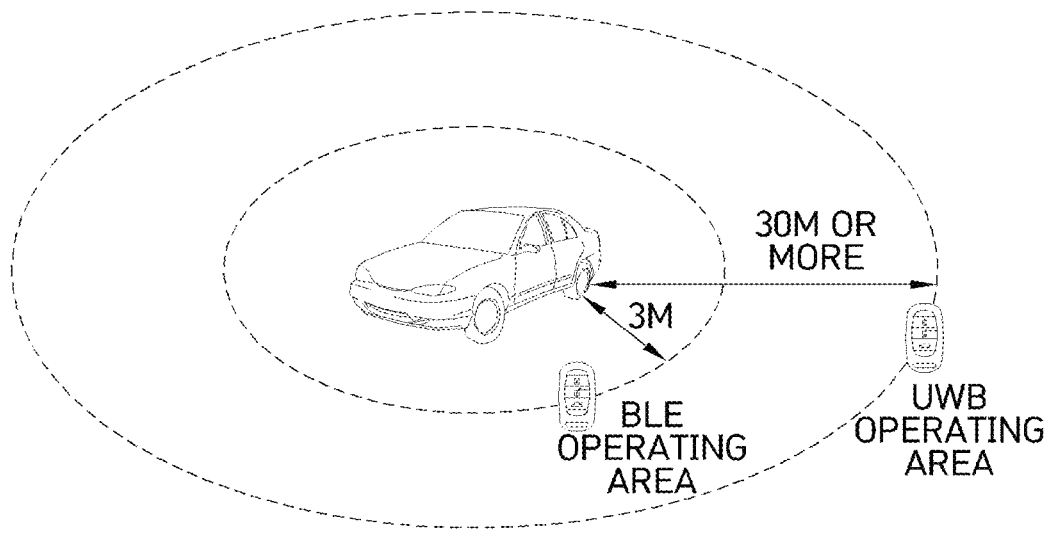
FIG. 3 is a diagram for describing an operation area on the basis of first and second frequency signals.
Figure 4:
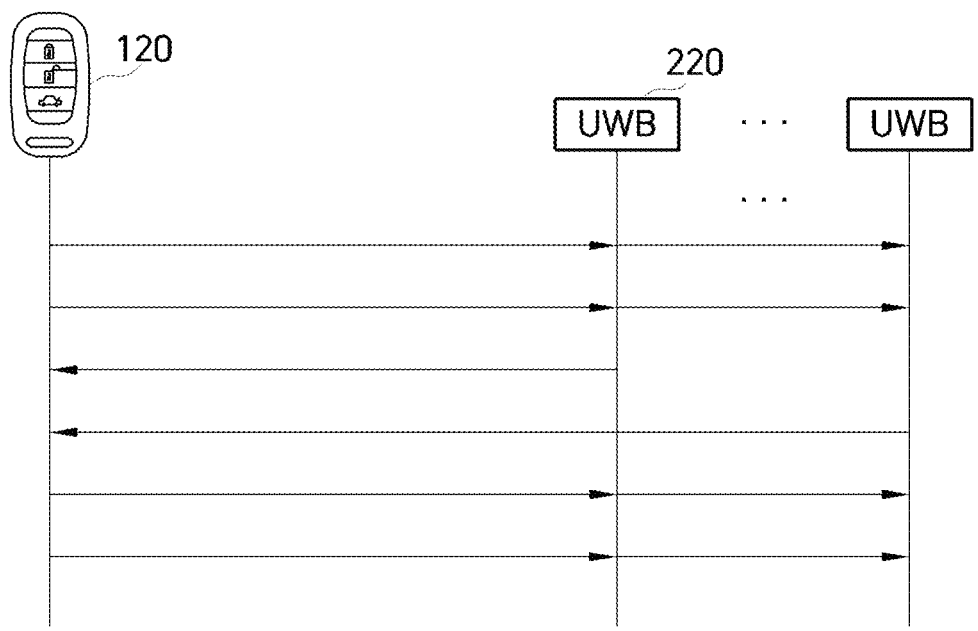
FIG. 4 is a diagram for describing an operation process on the basis of the second frequency signal.
Figure 5:
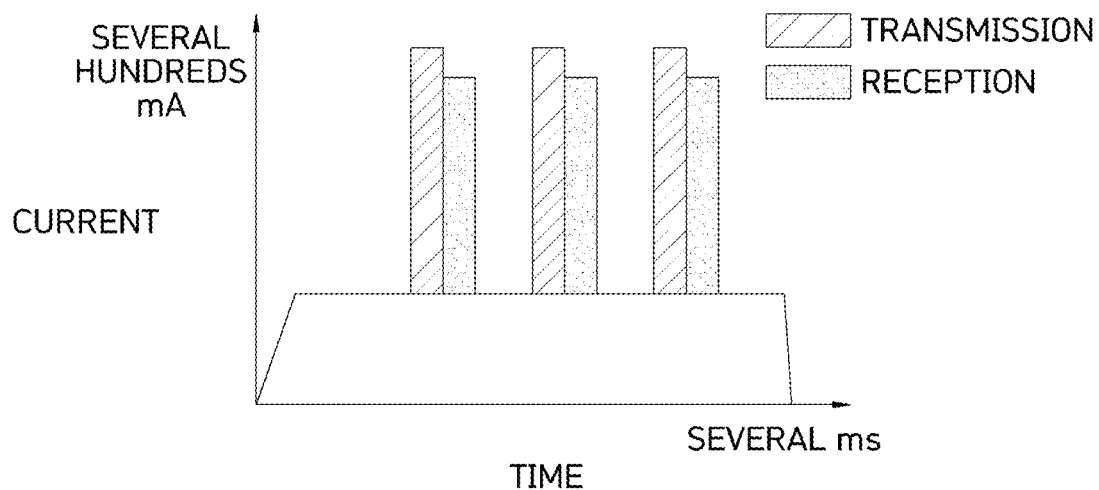
FIG. 5 is a diagram for describing the current consumption of a second frequency signal module.

FIG. 3 is a diagram for describing an operation area on the basis of the first and second frequency signals. FIG. 4 is a diagram for describing an operation process on the basis of the second frequency signal. FIG. 5 is a diagram for describing the current consumption of the second frequency signal module 120.

In a general case, when the user approaches the vehicle within 30 meters after the smart key remote controller 100 is connected to the BLE module 210 of the vehicle, as shown in FIG. 4, the second frequency signal module 120 of the smart key remote controller 100 periodically transmits data so as to allow the smart key control system 200 to check a position of the smart key remote controller 100.

As shown in FIG. 3, the operation on the basis of the second frequency signal is performed in only an area which is up to about 3 meters away from the vehicle. However, in the related art, UWB communication is periodically performed at a distance about 30 meters away from the vehicle. In the above process, the smart key remote controller 100 consumes an operating current of several hundreds of mA to degrade the lifetime of a coin battery, and eventually a problem in that the battery of the smart key remote controller 100 needs to be frequently replaced occurs.

In particular, as shown in FIG. 5, since the second frequency signal module 120 consumes a current of several hundreds of mA during data transmission and reception and a current of several tens of mA in a standby state of data transmission and reception, it is necessary to minimize unnecessary power consumption.

According to one embodiment of the present invention, in order to solve the above problem, the second frequency signal module 120 may be activated near the vehicle as much as possible to minimize power consumption.

First, the first frequency signal module 110 is connected to the BLE module 210 of the smart key control system 200 in the vehicle on the basis of the first frequency signal. That is, for using the vehicle, when the user approaches the vehicle in a state of possessing the smart key remote controller 100, the smart key remote controller 100 is connected to the BLE module 210 in the smart key control system 200 of the vehicle at a distance of 30 meters or more.

After the smart key remote controller 100 is connected to the smart key control system 200 of the vehicle through the first frequency signal module 110, a vibration detection value is acquired by the vibration detection sensor 140 of the smart key remote controller 100. In the above process, the smart key remote controller 100 detects movement of the user through the vibration detection sensor 140 without activating (waking up) the second frequency signal module 120.

The vibration detection sensor 140 is provided in the smart key remote controller 100 and checks the movement of the smart key remote controller 100, that is, a degree of movement of the user, and when the degree of movement exceeds a preset vibration value, the vibration detection sensor 140 transmits a motion detection signal to the control module 150. In this case, in one embodiment of the present invention, it has been described that the vibration detection sensor 140 compares the directly acquired vibration detection value with the preset vibration value and transmits the motion detection signal to the control module 150, but the present invention is not necessarily limited thereto, and in some embodiments, the vibration detection sensor 140 may acquire the vibration detection value and only transmit the vibration detection value to the control module 150, and the control module 150 may directly compare the vibration detection value with the preset vibration value to determine whether movement occurs.

Figure 6:
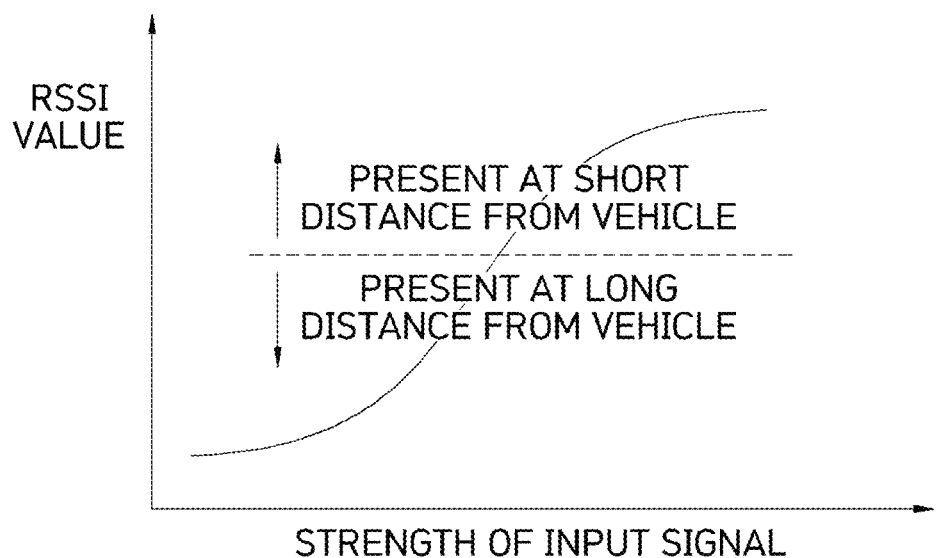
FIG. 6 is a diagram illustrating a received signal strength indicator (RSSI) curve of the first frequency signal.

In addition, the control module 150 checks the strength of the first frequency signal (a received signal strength indicator (RSSI)). According to one embodiment of the present invention, in order to reduce the battery consumption of the smart key remote controller 100, in addition to using the detection of the movement of the smart key remote controller 100, an RSSI value of the first frequency signal module 110 is checked. FIG. 6 is a diagram illustrating an RSSI curve of the first frequency signal.

Thereafter, the control module 150 checks whether the vibration detection value is greater than or equal to the preset vibration value and whether the strength of the first frequency signal is greater than or equal to a preset signal intensity value, and when check results satisfy the above conditions, the control module 150 activates the second frequency signal module 120. That is, according to one embodiment of the present invention, the movement of the user is detected, and only when the strength of the first frequency signal is greater than or equal to a predetermined value, the second frequency signal module 120 may be activated to minimize periodic communication with the UWB module in the vehicle.

Hereinafter, a control method according to a situation will be described after the second frequency signal module 120 is activated.

As one example, after the second frequency signal module 120 is activated, when a vibration detection value is not acquired for a first predetermined time in a state in which a door of the vehicle in a closed state is not controlled to be opened, the control module 150 controls the operation of the activated second frequency signal module 120 to be interrupted.

That is, when the user possessing the smart key remote controller 100 approaches the vehicle in a state in which the door of the vehicle is locked, a condition in which the second frequency signal module 120 is activated arises, and thus the smart key remote controller 100 periodically performs the UWB communication with the smart key control system 200. However, when the user does not control an opening of the door of the vehicle even after the first predetermined time (e.g., several minutes) elapses, a problem occurs in the battery consumption of the smart key remote controller 100. In this case, when the vibration detection value (or the motion detection signal of the user) is not acquired within several minutes, the control module 150 may interrupt the operation of the second frequency signal module 120 to minimize battery consumption.

As another example, after the second frequency signal module 120 is activated, when it is confirmed that the user gets out and the vehicle door is controlled to be closed in a state of being opened, the control module 150 may control to interrupt the operation of the activated second frequency signal module 120 after a second predetermined time elapses.

In this case, when the motion detection signal of the user is not acquired for the first predetermined time, as in the above-described example, the control module 150 may interrupt the operation of the second frequency signal module 120.

That is, when the user possessing the smart key remote controller 100 closes the door and gets out of the vehicle, does not move away from the vehicle and then stays near the vehicle, a condition in which the second frequency signal module 120 should periodically perform the UWB communication arises, and this is a factor causing battery consumption. As described above, when it is confirmed that the user closes the vehicle door and gets out of the vehicle, the control module 150 may control to interrupt the operation of the second frequency signal module 120.

As still another example, after the second frequency signal module 120 is activated, when it is confirmed that the user is in the vehicle, the control module 150 may control to interrupt the operation of the activated second frequency signal module 120 after a third predetermined time elapses. That is, when the smart key remote controller 100 is present in the vehicle, since there is no need to periodically check the location of the smart key remote controller 100, after the BLE communication is performed between the vehicle and the smart key remote controller 100 according to an operating condition of the user, the second frequency signal module 120 may be activated as necessary.

Meanwhile, together with or separately from the above examples, since the user is in a state of staying near the vehicle and is highly likely to control the vehicle after a while, the control module 150 may immediately interrupt the operation of the second frequency signal module 120 and set a communication period of the second frequency signal module 120 to be longer to reduce battery consumption. For example, immediately after the first predetermined time elapses, a first communication period is set to be longer than a second communication period to slightly reduce battery consumption, and when a predetermined period of time elapses, a third communication period is set to be longer than the second communication period to further reduce battery consumption, and even after that, when the movement of the user is not continuously detected, the operation of the second frequency signal module 120 may be controlled to be interrupted.

As described above, in one embodiment of the present invention, in a state in which the first frequency signal module 110 is connected to the smart key control system 200, when the vibration detection value is greater than or equal to the preset vibration value and the strength of the first frequency signal is greater than or equal to a preset strength value, the control module 150 activates the second frequency signal module 120. Furthermore, as the user gradually approaches the vehicle, it is possible to vary the communication period of the second frequency signal module 120, which is settable, to correspond to the strength of the first frequency signal. For example, within ranges of a maximum communication period and a minimum communication period of the second frequency signal module 120, as the strength of the first frequency signal is increased, the communication period of the second frequency signal module 120 may be controlled to be gradually shortened. That is, instead of communication at the same communication period every time, it is possible to control the communication period of the second frequency signal module 120 to be shortened by detecting a case in which the user gradually approaches the vehicle.

Furthermore, after the second frequency signal module 120 is activated and the control module 150 records the maximum communication period and the minimum communication period of the second frequency signal module 120 according to a distance from the user, when the maximum communication period and the minimum communication period are recorded a predetermined number of times or more, the control module 150 may apply an average communication period obtained by averaging the communication periods for each distance to control the second frequency signal module 120. In this case, there is an advantage in that power consumption similar to power consumption when the communication period of the second frequency signal module 120 is controlled to be shortened for each distance can be achieved, and complexity of the control can be reduced.

Hereinafter, a low power operating method of the smart key remote controller 100 of the vehicle according to one embodiment of the present invention will be described with reference to FIG. 7.

Figure 7:
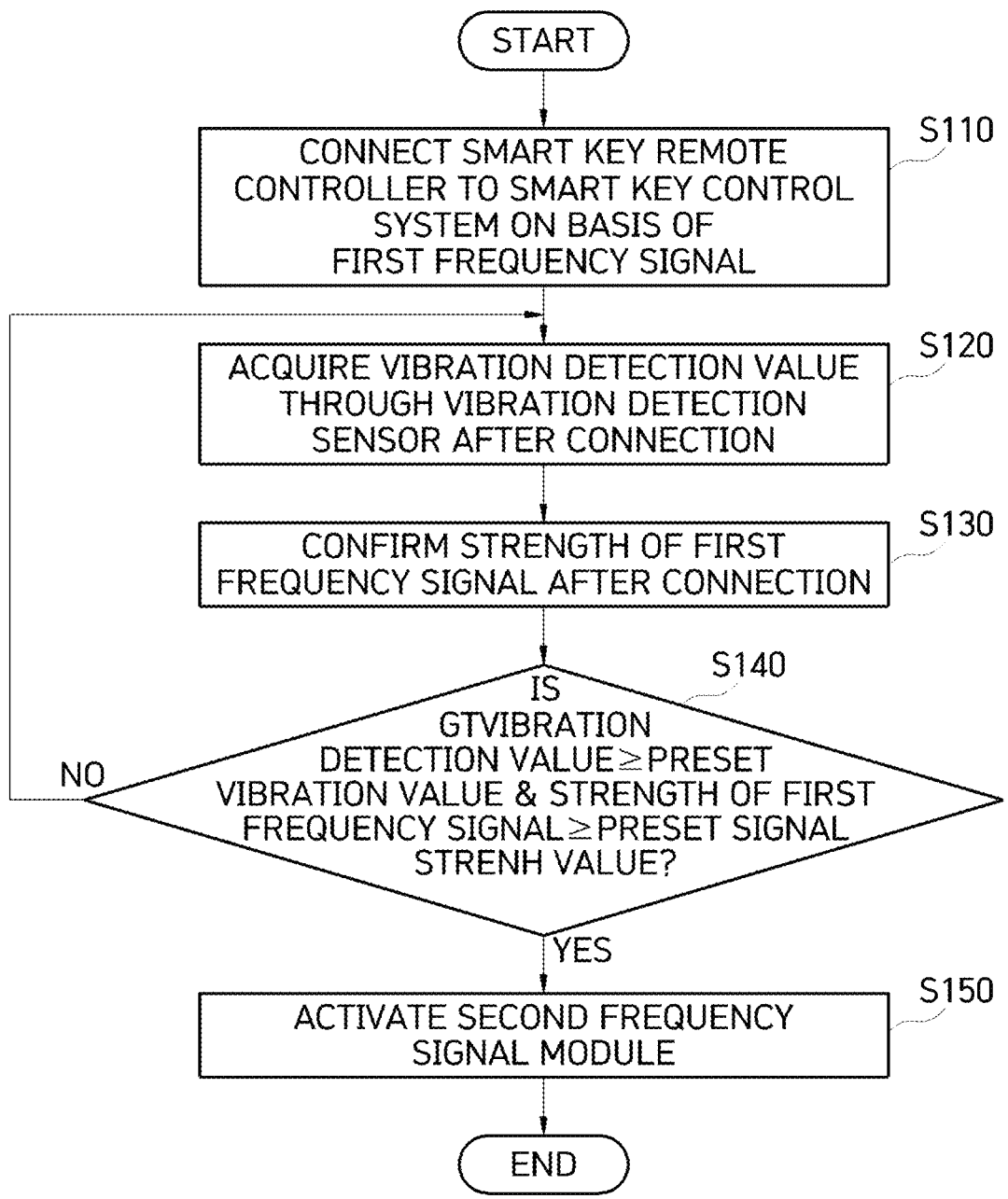
FIG. 7 is a flowchart of a low power operating method of a smart key remote controller of a vehicle.

FIG. 7 is a flowchart of a low power operating method of the smart key remote controller 100 of the vehicle.

Meanwhile, each operation shown in FIG. 7 may be understood as being performed by the smart key remote controller 100 described with reference to FIGS. 1 to 6, but the present invention is not necessarily limited thereto.

First, the smart key remote controller 100 is connected to the smart key control system 200 in the vehicle on the basis of the first frequency signal (S110) and then acquires the vibration detection value through the vibration detection sensor (S120).

Next, the smart key remote controller 100 checks the strength of the first frequency signal (RSSI) received after the connection (S130) and checks whether the vibration detection value is greater than or equal to the preset vibration value and whether the strength of the first frequency signal is greater than or equal to the preset signal strength value (S140).

When check results satisfy the above conditions, the second frequency signal module 120 is activated (S150).

Meanwhile, in the above description, operations S110 to S150 may be further divided into more operations or combined into fewer operations according to the embodiments of the present invention. In addition, some operations may be omitted, when necessary, and the order between operations may be changed. In addition, even when other contents are omitted, the contents of FIGS. 1 to 7 may also be applied to the contents of FIG. 7.

Hereinafter, the smart key control system 200 according to one embodiment of the present invention, which is interlinked with the smart key remote controller 100 and the operation method thereof described with reference to FIGS. 1 to 7, will be described with reference to FIGS. 8 to 10.

Meanwhile, the smart key control system 200 according to one embodiment of the present invention satisfies an operating condition of the smart key remote controller 100 for minimizing battery consumption and satisfies the replacement period of the current mass-produced smart key remote controller with a replacement period of the smart key remote controller 100.

Figure 8:
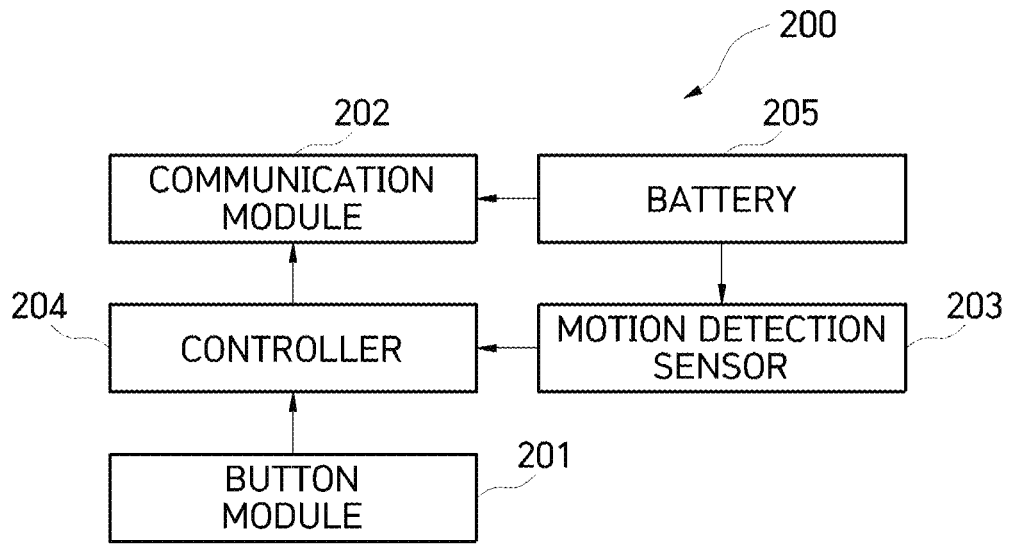
FIG. 8 is a block diagram for describing the motion-based smart key control system according to the present invention.

FIG. 8 is a block diagram for describing the motion-based smart key control system 200 according to the present invention.

As shown in FIG. 8, the motion-based smart key control system 200 and the operating method thereof according to one embodiment of the present invention include a button module 201, a communication module 202, a motion detection sensor 203, and a controller 204.

The button module 201 includes one or more buttons among a button for locking/unlocking a vehicle door, a button for turning starting of a vehicle on/off, a button for opening a trunk, and various vehicle control buttons.

The communication module 202 transmits and receives a control signal to and from the BLE module 210 in the vehicle through wireless communication to allow vehicle door locking/unlocking control and a vehicle starting function to be performed. In this case, as shown in FIG. 2, a BLE module 210, a UWB module 220, and an NFC module 230 may be provided even in a vehicle performing communication with the smart key remote controller 100.

In addition, the communication module 202 is the BLE module 210 using a BLE communication protocol of the 2.4 GHz band. Thus, in order for connection to the BLE module 210 that uses the BLE communication protocol and is installed in the vehicle, the communication module 202 periodically performs a remote keyless entry (RKE) operation (BLE communication) for driving.

The motion detection sensor 203 detects movement of the smart key remote controller 100. In the present embodiment, a vibration sensor is used, but the present invention is not limited thereto, and a sensor capable of detecting movement of the smart key remote controller 100, such as an acceleration sensor or a gyro sensor, may be used.

When the movement of the smart key remote controller 100 is detected by the motion detection sensor 203, the controller 204 controls the communication module 202 of the vehicle to operate and transmits a control signal, which corresponds to the button module 201 selected by the user, to the communication module 202 in the vehicle through the communication module 202. Meanwhile, only when a value of sensing information provided from the motion detection sensor 203 is greater than or equal to a set threshold value, the controller 204 may generate an interruption to determine that the smart key remote controller 100 is moved.

A main control unit (MCU) may be used as the controller 204 according to one embodiment of the present invention.

In this case, a method of controlling, by the controller 204, the operation of the communication module 202 may be a method of controlling power of the communication module, but the present invention is not limited thereto, and a method of controlling power supplied from a battery 205 using a separate switch to be prevented from being applied to the communication module 202 may be used.

According to one embodiment of the present invention, only when the movement of the smart key remote controller 100 is detected through the motion detection sensor 203, the communication module 202 for performing an operation for connecting to the BLE module 210 of the vehicle is operated so that there is an effect of minimizing battery consumption of the smart key remote controller 100.

As described above, a capacity of the coin battery mounted in the smart key remote controller 100 is usually 600 mAh, and the coin battery consumes a current of several thousands of $\mu A$ when periodically performing a BLE scan function in order for connection to the BLE module 210 of the vehicle so that the coin battery is prematurely discharged and is expected to be discharged within 7 to 8 months. However, according to the embodiment of the present invention, the communication module is operated only when the driver moves while holding the smart key remote controller 100 so that there is an effect of increasing the use time of the coin battery of the smart key remote controller 100.

Figure 9:
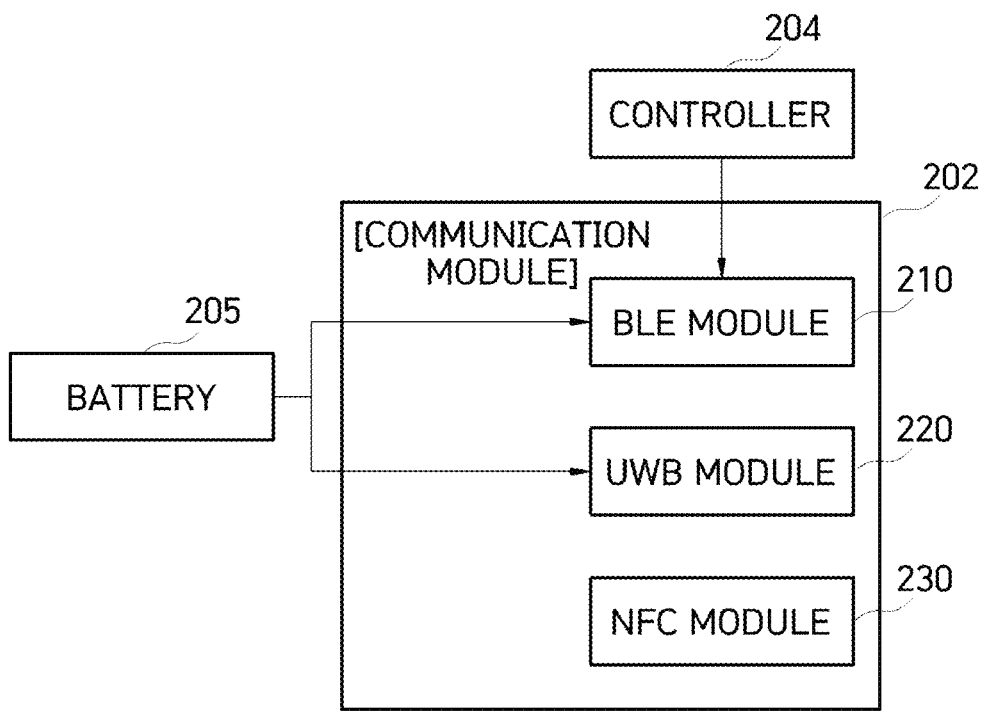
FIG. 9 illustrates an example communication module for the smart key control system according to one embodiment of the present invention.

Meanwhile, as shown in FIG. 9, the communication module 202 according to one embodiment of the present invention may further include the UWB module 220 using a UWB communication protocol of a 6.5 GHz band.

According to the present invention, the communication module 202 may provide the vehicle door locking/unlocking control and the vehicle starting function by performing communication with the UWB module 220 installed in the vehicle at a short distance (within 6 m) and may be used as a communication part for checking a location of the smart key remote controller 100 in the vicinity of the vehicle.

Accordingly, in one embodiment of the present invention, there is an effect in that, when the smart key remote controller 100 is located at a long distance (30 m or more) from the vehicle, the communication module 202 may provide the vehicle door locking/unlocking control and a remote vehicle starting function through the BLE module 210, and when the smart key remote controller 100 is located at a short distance (within 6 m) from the vehicle, the communication module 202 may provide the vehicle door locking/unlocking control and the vehicle starting function through the UWB module 220.

In addition, as shown in FIG. 9, the communication module 202 according to one embodiment of the present invention may further include the NFC module 230 using an NFC communication protocol of a 13.56 MHz band.

Generally, since the smart key remote controller 100 includes the battery, the battery may be discharged, when the battery of the smart key remote controller 100 is discharged, the communication module 202 may provide the vehicle door locking/unlocking control and the vehicle starting control function through the NFC module 230 without using a battery.

Therefore, even in the case of emergency in which the battery of the smart key remote controller 100 is discharged, it is possible to control the vehicle door locking/unlocking and the starting of the vehicle.

Hereinafter, a method performed by the motion-based smart key control system 200 according to one embodiment of the present invention will be described with reference to FIG. 10.

First, the controller 204 of the smart key remote controller 100 determines whether the movement of the smart key remote controller 100 is detected through the motion detection sensor 203 (S210).

When the movement of the smart key remote controller 100 is detected (YES) in the determination (S210), the communication module (202) is turned on to perform a search process (an RKE operation) in order for connection to the communication module 202 of the vehicle (S220). Here, the communication module 202 may be the BLE module 210 using a BLE communication protocol of a 2.4 GHz band.

In this case, when the controller 204 turns the communication module 202 on, the communication module 202 may be set to be turned off after operated only for a preset time.

Thereafter, when the user selects a button from the button module 201 (S230), a control signal (a door locking/unlocking control signal or a starting control signal) corresponding to the selected button is transmitted to the vehicle (S240).

Otherwise, when the movement of the smart key remote controller 100 is not detected (NO) in the determination (S210), the communication module 202 is turned off (S250).

As described above, since the communication between the smart key remote controller 100 and the vehicle is controlled according to the movement of the smart key remote controller 100, there is an effect of improving efficiency of the battery of the smart key remote controller 100 to extend a replacement period of the battery.

The above-described low power operating method of the smart key remote controller 100 in the vehicle according to one embodiment of the present invention may be implemented as a program (or application) to be executed in combination with a computer, which is hardware and be stored in a medium.

In order for the computer to read the program and execute the method implemented as the program, the above-described may include code coded using computer languages, such as C, C++, JAVA, Ruby, and machine language, which may be read by a processor (central processing unit (CPU)) of the computer through a device interface of the computer. Such code may include functional code related to a function defining required functions executing the method and include control code related to an execution procedure, which are required for the processor of the computer to execute the required functions according to a predetermined procedure. In addition, such code may further include additional information required for the processor of the computer to execute the required functions or include code related to memory references in which media references a location (address) in an internal or external memory of the computer. In addition, when the processor of the computer needs to communicate with any other computers or servers in a remote location so as to execute the required functions, the code may further include communication-related code for how to communicate with any other remote computers or servers using a communication module of the computer and communication-related code for what information or media to transmit/receive during communication.

The storage medium refers to a medium which stores data semi-permanently and is readable by a device instead of a medium which stores data for a short period of time, such as a register, a cache, or a memory. Specifically, examples of the storage medium include a read only memory (ROM), a random access memory (RAM), a compact disc (CD)-ROM, a magnetic tape, a floppy disk, and an optical data storage device, but the present invention is not limited thereto. That is, the program may be stored in various recording media of various servers which the computer can access or in various recording media of the computer of a user. In addition, the storage medium may be provided as storage media distributed in computer systems connected to a network, and computer-readable code may be stored in the storage media in a distributed manner.

In accordance with the above-described embodiments of the present invention, there is an advantage in that a lifetime of a battery of a smart key remote controller is increased, and thus a replacement period of a coin battery can be increased.

It should be noted that effects of the present invention are not limited to the above described effect, and other effects of the present invention not mentioned above can be clearly understood by those skilled in the art from the above description.

The above-described description of the present invention is intended only for illustrative purposes, and it can be easily understood that other concrete forms can be devised by those skilled in the art without changing or modifying the technical spirit or essential characteristics of the present invention. Therefore, it should be understood that the above-described embodiments are not restrictive but illustrative in all aspects. For example, each component described as a single form may be distributed and implemented, and similarly, components described as being distributed may also be implemented in a combined form.

The scope of the present invention is defined by the appended claims rather than the detailed description, and it should be construed that all alterations or modifications derived from the meaning and scope of the appended claims and the equivalents thereof fall within the scope of the present invention.

What is claimed is:

1. A low power operating method for a smart key remote controller of a vehicle, the method comprising:
    connecting the smart key remote controller to a smart key control system in the vehicle based on a first frequency signal;
    acquiring a vibration detection value through a vibration detection sensor;
    checking a received signal strength of the first frequency signal received after the connection;
    determining whether the vibration detection value is greater than or equal to a preset vibration value and the received signal strength of the first frequency signal is greater than or equal to a preset signal strength value; and
    when a determination result is satisfied, activating a second frequency signal module of the smart key remote controller corresponding to a second frequency signal.

2. The method of claim 1, wherein:
    the first frequency signal includes a signal based on a Bluetooth low energy (BLE) module; and
    the second frequency signal includes a signal based on an ultra-wide band (UWB) module.

3. The method of claim 1, further comprising, when a door of the vehicle is closed and not controllable to be opened after the second frequency signal module is activated, interrupting an operation of the activated second frequency signal module when the vibration detection value is not acquired for a first predetermined time.

4. The method of claim 1, further comprising, after the second frequency signal module is activated, when it is confirmed that a user gets out of the vehicle and a door of the vehicle is opened and controllable to be closed, interrupting an operation of the activated second frequency signal module after a second predetermined time elapses.

5. The method of claim 4, further comprising, after the second frequency signal module is activated, when it is confirmed that the user gets out of the vehicle and the door of the vehicle is opened and controllable to be closed, and when the vibration detection value is not acquired for a first predetermined time, interrupting an operation of the activated second frequency signal module.

6. The method of claim 1, further comprising, after the second frequency signal module is activated, when it is confirmed that a user is in the vehicle, interrupting an operation of the activated second frequency signal module after a third predetermined time elapses.

7. A smart key remote controller for a vehicle, which allows low power operation, the smart key remote controller comprising:
    a first frequency signal module connected to a smart key control system based on a first frequency signal;
    a second frequency signal module connected to a smart key control system based on a second frequency signal;
    a vibration detection sensor configured to acquire a vibration detection value after connection through the first frequency signal module; and
    a control module configured to measure a received signal strength of the first frequency signal received after the connection through the first frequency signal module and activate the second frequency signal module based on whether the vibration detection value is greater than or equal to a preset vibration value and whether the received signal strength of the first frequency signal is greater than or equal to a preset signal strength value.

8. The smart key remote controller of claim 7, wherein:
    the first frequency signal module is a Bluetooth low energy (BLE) module; and
    the second frequency signal module is an ultra-wide band (UWB) module.

9. The smart key remote controller of claim 7, wherein, in a state in which a door of the vehicle is closed and not controllable to be opened after the second frequency signal module is activated, the control module interrupts an operation of the activated second frequency signal module when the vibration detection value is not acquired for a first predetermined time.

10. The smart key remote controller of claim 7, wherein, after the second frequency signal module is activated, when it is confirmed that a user gets out of the vehicle and a door of the vehicle is opened state and controllable to be closed, the control module interrupts an operation of the activated second frequency signal module after a second predetermined time elapses.

11. The smart key remote controller of claim 10, wherein, when the vibration detection value is not acquired for a first predetermined time, the control module interrupts an operation of the activated second frequency signal module.

12. The smart key remote controller of claim 7, wherein, after the second frequency signal module is activated, when it is confirmed that a user is in the vehicle, the control module interrupts an operation of the activated second frequency signal module after a third predetermined time elapses.

13. A motion-based smart key control system comprising:
    a communication module configured to transmit and receive a control signal to and from a communication module in a vehicle through wireless communication so as to perform vehicle door locking/unlocking control and a vehicle starting function;
    a motion detection sensor configured to detect movement of a smart key remote controller; and
    a controller configured to turn the communication module on to perform a process of searching for the communication module provided in the vehicle when the movement of the smart key remote controller is detected by the motion detection sensor.

14. The motion-based smart key control system of claim 13, wherein the controller turns the communication module off when the movement of the smart key remote controller is not detected by the motion detection sensor.

15. The motion-based smart key control system of claim 13, wherein the controller drives the communication module for a preset time when the movement of the smart key remote controller is detected by the motion detection sensor.

16. The motion-based smart key control system of claim 13, wherein the communication module includes a Bluetooth low energy (BLE) module using a BLE communication protocol of a 2.4 GHz band.

17. The motion-based smart key control system of claim 13, wherein the communication module further includes an ultra-wide band (UWB) module using a UWB communication protocol of a 6.5 GHz band.

18. The motion-based smart key control system of claim 13, wherein the communication module further includes a near field communication (NFC) module using an NFC communication protocol of a 13.56 MHz band.

19. The motion-based smart key control system of claim 13, wherein the motion detection sensor includes one of a vibration sensor, an acceleration sensor, and a gyro sensor.

* * * * *